(12) United States Patent
Ramasamy et al.

(10) Patent No.: US 11,829,271 B2
(45) Date of Patent: Nov. 28, 2023

(54) TUNING DATA PROTECTION POLICY AFTER FAILURES

(71) Applicant: Hewlett Packard Enterprise Development LP, Houston, TX (US)

(72) Inventors: Sankar Ramasamy, Bangalore Karnataka (IN); Aswin Jayaraman, Bangalore Karnataka (IN); Sijesh Thondapilly Balakrishnan, Bangalore Karnataka (IN); Alastair Slater, Chepstow (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 259 days.

(21) Appl. No.: 17/249,531

(22) Filed: Mar. 4, 2021

(65) Prior Publication Data

US 2022/0284000 A1 Sep. 8, 2022

(51) Int. Cl.
*G06F 11/20* (2006.01)
*G06F 11/14* (2006.01)
*G06F 3/06* (2006.01)

(52) U.S. Cl.
CPC ........ *G06F 11/2097* (2013.01); *G06F 3/0604* (2013.01); *G06F 3/065* (2013.01); *G06F 3/067* (2013.01); *G06F 11/1456* (2013.01); *G06F 11/1461* (2013.01); *G06F 11/1469* (2013.01); *G06F 11/2094* (2013.01); *G06F 2201/84* (2013.01)

(58) Field of Classification Search
CPC .. G06F 16/217; G06F 16/219; G06F 16/2365; G06F 3/0604; G06F 3/065; G06F 3/067; G06F 11/1469

USPC ......................................................... 707/803
See application file for complete search history.

(56) References Cited

U.S. PATENT DOCUMENTS

| 8,341,121 | B1 | 12/2012 | Claudatos et al. |
| 9,621,585 | B1 | 4/2017 | Satish et al. |
| 9,632,875 | B2 | 4/2017 | Raichstein et al. |
| 10,824,514 | B2 | 11/2020 | Abdul et al. |

(Continued)

OTHER PUBLICATIONS

Sumathi, D. et al.; "A Dynamic Policy-Based Security-As-A-Service Infrastructure For Cloud Environment"; May 2014; 7 pages.

(Continued)

*Primary Examiner* — Hosain T Alam
*Assistant Examiner* — Nicholas E Allen
(74) *Attorney, Agent, or Firm* — Trop, Pruner & Hu, P.C.

(57) ABSTRACT

Examples described herein relate to a data protection policy management system (DPPMS) for tuning a data protection policy in events of failures. The DPPMS may detect a failure associated with an application that is protected via the data protection policy that includes settings corresponding to parameters comprising one or more of copy tiers, a data retention interval and a recovery point objective (RPO) for the copy tiers. The DPPMS may determine a type of the failure associated with the application. Further, the DPPMS may select, based on the type of the failure, at least one parameter of the parameters to be tuned in response to detection of the failure. Moreover, the DPPMS may tune the settings corresponding to the at least one selected parameter to adapt the data protection policy.

19 Claims, 9 Drawing Sheets

(56) References Cited

U.S. PATENT DOCUMENTS

2016/0048408 A1* 2/2016 Madhu ................. H04L 47/783
  718/1
2021/0049077 A1* 2/2021 Gibbons, Jr. ....... G06F 11/3058

OTHER PUBLICATIONS

Veritas, "Creating storage unit groups for backups," Sep. 25, 2017, Veritas NetBackup™ Administrator's Guide, vol. I, excerpt from Section III, <https://www.veritas.com/content/support/en_US/doc/18716246-126559472-0/v41275557-126559472>.

* cited by examiner

TUNING DATA PROTECTION POLICY AFTER FAILURES

BACKGROUND

Data corresponding to various applications (hereinafter referred to as application data) may be stored on storage nodes, such as a server, a storage array, a cluster of servers, a computer appliance, a workstation (stationary or portable), a storage system, a converged system, a hyperconverged system, or the like. In order to enable recovery of the application data in an event of a loss of functionality of the application or a failure of a primary storage node storing the data of the application, the data may be backed-up by storing one or more types of copies of the application data locally, on one or more secondary storage devices, or on cloud storage. Such one or more types of copies of the application data may be updated and maintained at the respective locations according to one or more data protection policies that define several parameters indicative of how and where the backups are stored.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
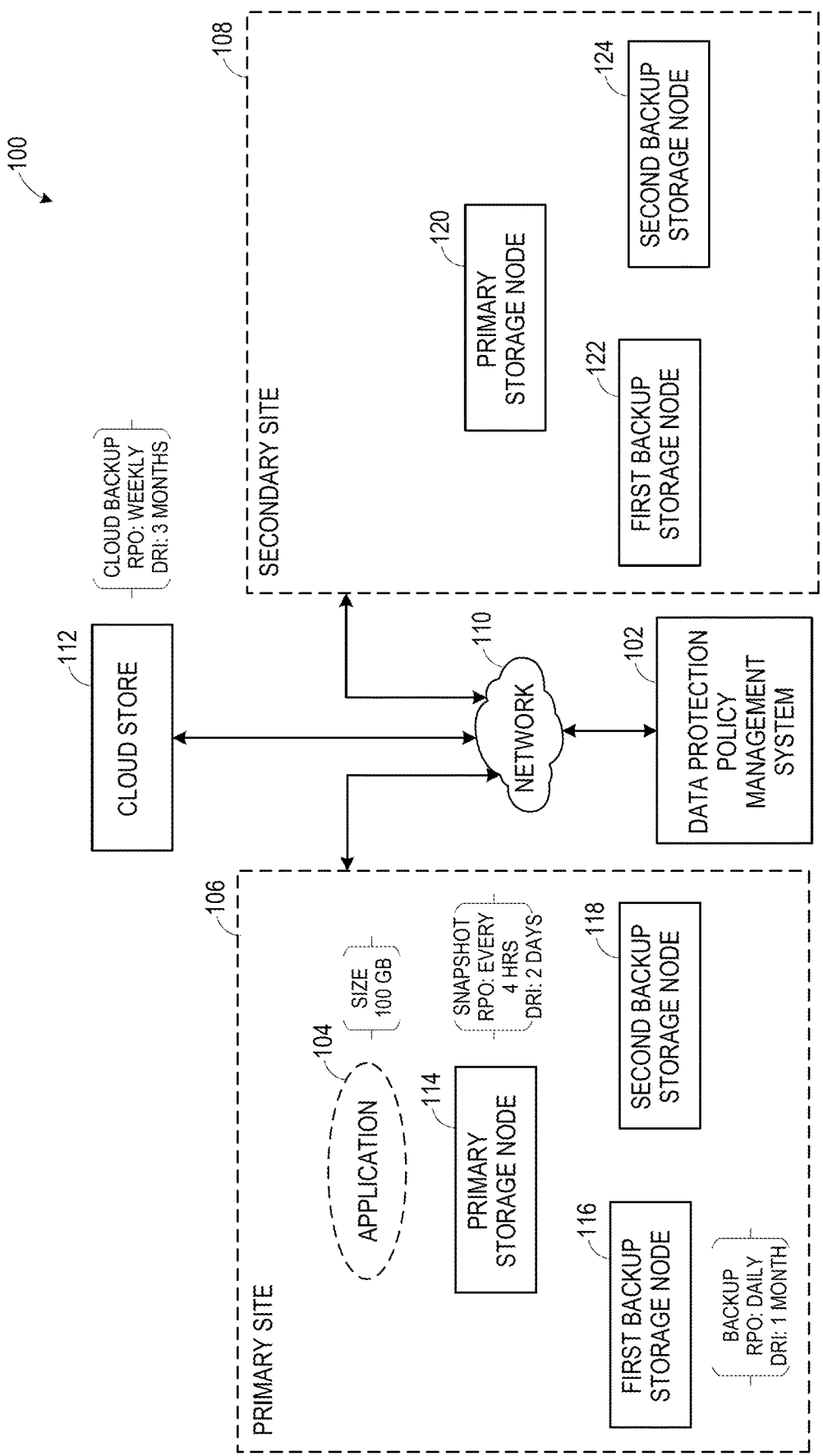
FIG. 1 depicts a networked system including a data protection policy management system (DPPMS) for managing a data protection policy for an application, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Applications such as, but not limited to, a software program, a virtual machine (VM), a container, a pod, a database, a data store, a logical disk, or a containerized application may be executed in a networked system (e.g., data center hosting several storage nodes) or on a standalone storage nodes accessible via network. Data corresponding to an application (hereinafter referred to as application data) may be stored on storage nodes, such as a server, a storage array, a cluster of servers, a computer appliance, a workstation (stationary or portable), a storage system, a converged system, a hyperconverged system, or the like. A storage node that stores the application data is hereinafter referred to as a primary storage node. Also, the application data stored on the primary storage node is hereinafter referred to as an original application data. Hereinafter, the terms "application data" and the "original application" are interchangeably used. In some implementations, one or more storage nodes including the primary storage node may be hosted on in a common facility (e.g., data center), hereinafter referred to as a primary site. During operation of the application, in certain unfortunate situations, one or more of the application, the primary storage node storing the original application data, or the primary site hosting the primary storage node may experience a failure condition, including but not limited to, malfunctioning, loss of functionality, and/or downtime. As it is apparent, during such failure condition, the original application data may be lost and the application, the primary storage node, and/or the entire site may become inaccessible.

In order to enable recovery of the application data corresponding to the application in one or more of such failure conditions associated with the application, the primary storage, or the primary site, the original application data may be backed-up via one or more types of copies of the original application data locally, on one or more secondary storage devices, or on cloud storage. Example types of the copies may include, but are not limited to, a snapshot, a backup, or a cloud-backup. A snapshot corresponding to the application may refer to a point in time copy of at least a portion of the original application data. The snapshots may be stored locally within the primary storage node. The snapshots may be used for various purposes, such as creating a checkpoint for restoring the state of an application, a source for data mining. The point in time at which a snapshot is created and frequency of creating a snapshot may be defined in a data protection policy. In some examples, several snapshots may be maintained to record the changes over a period of time. Snapshots may be recorded periodically after a predetermined time interval or each time a transaction is performed on the portion of data. In an example, a snapshot may be created every time a transaction is performed i.e., when a portion of the data is created, modified or deleted.

Further, the back-up may refer to a copy or duplicate of the data. In the context of the application referenced hereinabove, a backup of the application may refer to a copy of the original application data corresponding to the application stored in the primary storage node. The backup is generally stored on a separate storage node than the primary storage node that stores the original application data, thereby making it suitable for disaster recovery. Generally creation of the back-up takes longer time to complete (e.g., ranging from minutes, hours, or days, depending on the size of the original data). Also, the backups are generally planned to be stored for longer periods of time in comparison to the snapshots. Moreover, the cloud-backup may refer to a copy of the back-up stored remotely on a storage offered by cloud network (public or private), hereinafter referred to as a cloud storage system. Typically, the cloud-backup may be planned to be stored for longer periods of time in comparison to the back-ups.

In a networked system (e.g., a data center), the copies of the data corresponding to the application may be managed by implementing a data protection policy. For a given application, the data protection policy may be defined by specifying parameters indicative of what type of copies to be managed, frequency of creating the copies, and/or durations for maintaining the copies for the given application. Typically, the parameters specified in the data protection policy are based on data protection and recovery requirements, performance service level agreements (SLAs) corresponding to the application, and/or capabilities (e.g., storage space and/or performance headroom) of storage nodes designated to store the respective copies.

In the events of failures associated with the application, the primary storage node storing the original application data and the snapshots, the secondary storage node storing the backup data, and/or the primary site hosting the application, the application may be operationalized on another site (e.g., another data center) and/or another primary storage node. Such process of operationalizing of the application on a different site is also referred to as failover of the application and the site to which the application is failed-over is referred to as a secondary site or a failover site. As will be understood, the data protection policy that was defined when the application was originally executing on the primary site may not be feasible as the secondary site may not have resources that can fulfill the originally defined data protection policy. Accordingly, in some situations, continuing with the original data protection policy after the failure/disaster would have other implications like performance SLA violations, data compliance violations and copy creation failures, and the like. Although, such data protection policy may be altered manually, the manual alteration of the data protection policy demands monitoring of the failovers of the application, an extensive study of the new site and its resources and a laborious task of updating various settings in the data protection policy. The situation may become even more challenging to handle as there may be multitude of such applications which have failed-over to the secondary site and each may have respective data protection policy which may need alteration.

Examples described herein address these technological problems by implementing a data protection policy management system (DPPMS) that dynamically tunes a data protection policy defined for a given application in an event of a failure. In accordance with the aspects of the present disclosure, the DPPMS implemented in a networked system may detect a failure associated with an application that is protected via the data protection policy. The data protection policy may include settings corresponding to parameters comprising one or more of copy tiers, a data retention interval and a recovery point objective (RPO) for the copy tiers. The DPPMS may determine a type of the failure associated with the application. Further, the DPPMS may select, based on the type of the failure, at least one parameter of the parameters to be tuned in response to detection of the failure. Moreover, the DPPMS may tune the settings corresponding to the at least one selected parameter to adapt the data protection policy.

In some examples, the DPPMS may tune the data protection policy in accordance with the type of a failure, user preferences (e.g. tolerances and/or alternative copy tiers) specified in the data protection policy and capabilities of a discovered target storage device or a secondary site hosting the application after the failure has happened. In particular, such dynamic tuning of the data protection policy minimizes of chances of the performance SLA violations, data compliance violations and copy creation failures, and the like. Additionally, the dynamic tuning of the data protection policy as effected by the data protection policy management system may avoid or minimize manual interventions thereby saving cost and complexities.

Referring now to the drawings, in FIG. 1, a networked system 100 including a data protection policy management system (DPPMS) 102 for managing data protection policy for an application 104 is presented, in accordance with an example. The networked system 100 depicted in FIG. 1 may include one or both of a primary site 106 and a secondary site 108 that are communicatively coupled to each other via a network 110. Further, the networked system 100 may include a cloud store 112 accessible by one or both of the primary site 106 and the secondary site 108 via the network 110. Moreover, the networked system 100 may also include the DPPMS 102 coupled to the network 110.

In some examples, the networked system 100 may be a distributed system where one or more of the primary site 106, the secondary site 108, the DPPMS 102, and cloud store 112 are located at physically different locations (e.g., on different racks, on different enclosures, in different buildings, in different cities, in different countries, and the like) while being connected via the network 110. In certain other examples, at least a portion of the networked system 100 may be a turnkey solution or an integrated product. In some examples, the terms "turnkey solution" or "integrated product" may refer to a ready for use packaged solution or product where the storage nodes (described later) in the primary site 106 and/or the secondary site 108 and the DPPMS 102 are disposed within a common enclosure or a common rack. Moreover, in some examples, the networked system 100 in any form, be it the distributed system, the turnkey solution, a set of turnkey solutions, or the integrated product, may be capable of being reconfigured by adding or removing storage nodes and/or by adding or removing internal resources (e.g., compute, storage, network cards, etc.) to and from the storage nodes and the DPPMS 102.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 110 may include one or more network switches, routers, or network gateways to facilitate data communication. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via a wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the primary site 106, the secondary site 108, the cloud store 112, and the DPPMS 102.

The primary site 106 and/or the secondary site 108 may represent an information technology (IT) infrastructures, for example, a data center, a private cloud, a customer's on-premise IT setup, and the like, that may host one or more storage nodes facilitating storage and/or compute capabilities for one or more applications, such as, the application 104. In the example implementation of FIG. 1, the primary site 106 is shown to include a plurality of storage nodes such as a primary storage node 114 and one or more backup storage nodes, for example, a first backup storage node 116 and a second backup storage node 118. Similarly, for illustration purposes, the secondary site 108 is also shown to include a primary storage node 120 and one or more backup storage nodes, for example, a first backup storage node 122 and a second backup storage node 124. The primary storage nodes 114, 120, the first backup storage node 116, 122, and the second backup storage node 118, 124 are hereinafter collectively referred to as a storage nodes 114-124. In some examples, although not shown in FIG. 1, the storage nodes within the primary site 106 or the secondary site 108 may communicate with each other via a network similar to the network 110.

In the example implementation of FIG. 1, the networked system 100 is shown to include two sites—the primary site 106 and the secondary site 108 for illustration purposes. In some other examples, the networked system 100 may include any number of sites, without limiting the scope of the present disclosure. Further, although each of the primary site 106 and the secondary site 108 is shown to include three storage nodes, the scope of the present disclosure if not limited with respect to number of storage nodes in the primary site 106 and the secondary site 108. Moreover, in some other examples, the primary site 106 and the secondary site 108 may have different number of storage nodes.

One or more of the storage nodes 114-124 may facilitate storage, compute, and/or communication capabilities to one or more applications. Examples of the storage nodes 114-124 may include, but are not limited to, a server, a storage array, a cluster of servers, a computer appliance, a workstation (stationary or portable), a storage system, a converged system, a hyperconverged system, desktop computer, a laptop, or a smartphone. Further, in some examples, the storage nodes 114-124 may include one or more of solid state drives (SSD), Random Access Memory (RAM), an Electrically Erasable Programmable Read-Only Memory (EEPROM), a storage drive, a flash memory, a Compact Disc Read Only Memory (CD-ROM), or the like. Furthermore, in some examples, the storage nodes 114-124 may also include a processing resource which may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices such as but not limited to integrated circuit (IC), control logic, electronic circuits, or combinations thereof that include a number of electronic components.

In some examples, the storage nodes 114, 116, 118 may be arranged as storage area network (SAN) in the primary site 106 and are accessible by the application 104 via one or more SAN paths (not shown). Similarly, in some examples, the storage nodes 120, 122, and 124 may also be arranged as SAN in the secondary site 108 and are accessible via one or more SAN paths (not shown). In a SAN, communication to and from various storage nodes may be enabled via technologies such as Fibre Channel (FC), Internet Small Computing System Interface (iSCSI), and the like. The FC technology may utilize a Fibre Channel Protocol (FCP) for open systems and proprietary variants for mainframes. In addition, in some examples, use of Fibre Channel over Ethernet (FCoE) makes it possible to move FC traffic across existing high speed Ethernet infrastructures and converge storage and IP protocols onto a single cable.

The application 104 may be hosted in the primary site 106 on the primary storage node 114 or any host device (e.g., storage node, a server, a computer, or the like) other than the primary storage node 114. Examples of the application 104 may include, but are not limited to, any software program including executable instructions, a virtual machine (VM), a container, a pod, a database, a data store, a logical disk, or a containerized application. It is to be noted that the scope of the present disclosure is not limited with respect to a type of the application 104. During operation of the application 104, the application 104 may consume, process, and/or generate data. The data that is consumed, processed, and/or generated by the application 104 is hereinafter referred to as an application data. The application data associated with the application 104 may include, but is not limited to, file names, filesystem configuration details, metadata information about the file, file size, file status information, and actual data/content of the files corresponding to the application 104. In some examples, the application data corresponding to the application 104 is stored in the primary storage node 114. The application data that is stored in the primary storage node 114 is also alternatively referred to as an original application data.

During operation of the application 104, in certain unfortunate situations, one or more of the application 104, the primary storage node 114 storing the original application data, or the primary site 106 hosting the primary storage node 114 may experience a failure such as, but not limited to, malfunctioning, loss of functionality, and/or downtime. Examples of the failures may include, but are not limited to, a SAN path failure, a site failure (e.g., a failure of the primary site 106), a storage capacity exhaustion of the primary storage node 114 and/or the backup storage nodes 116, 118, a node failure, such as, failures of the primary storage node 114 and/or the backup storage nodes 116, 118, and the like.

In order to enable recovery of the original application data, the original application data may be backed-up via one or more types of copies of the original application data. Such types of copies may be stored locally (e.g., on the primary storage node 114), on one or more secondary storage devices, or on cloud storage (e.g., on the cloud store 112). Example types of the copies may include, but are not limited to, a snapshot, a backup, or a cloud-backup. A snapshot corresponding to the application 104 may refer to a point in time copy of at least a portion of the original application data. The snapshots may be stored locally within the primary storage node 114. In some examples, several snapshots of the application 104 may be maintained to record the changes over a period of time. Further, the back-up may refer to a copy or duplicate of a data. In the context of the application 104 referenced hereinabove, a backup of the application 104 may refer to a copy of the original application data corresponding to the application data stored in the primary storage node 114. The backup is generally stored on a separate storage node, for example, any of the first backup storage node 116 or the second storage node, thereby making it suitable for disaster recovery. Generally, the creation of the back-up takes longer time to complete (e.g., ranging from minutes, hours, or days, depending on the size of the original data). Also, the backups are generally planned to be stored for longer periods of time in comparison to the snapshots. Moreover, the cloud-backup may refer to a copy of the back-up/the original application data stored remotely on a storage offered by cloud network (public or private), hereinafter referred to as a cloud store 112. Typically, the cloud-backup may be planned to be stored on the cloud store 112 for longer periods of time in comparison to the backups.

In the networked system 100, the copies of the application data may be managed by implementing a data protection policy via the DPPMS 102. In the example of FIG. 1, for illustration purposes, the DPPMS 102 is shown as being deployed outside the primary site 106 and the secondary site 108. In some other examples, the DPPMS 102 may be hosted on one or both of the primary site 106 and the secondary site 108 either as a standalone computing system (e.g., a server) or as a DPPMS application running on any host computing system (e.g., on any of the storage nodes 114-124). The DPPMS application may be implemented as a software program, a virtual machine (VM), a container, a pod, or a containerized application. Additional details regarding the DPPMS 102 are described in conjunction with FIG. 3. In particular, the DPPMS 102 may manage implementation of the data protection policy to ensure that data protection for the application 104 is feasible according to the defined data protection policy even after any failure. Moreover, the DPPMS 102 may also keep the user (e.g., an administrator) of the application 104 informed about any compromise that is going to be mode in the data protection policy in accordance with certain defined tolerances.

For the given application 104, the data protection policy may be defined by specifying parameters indicative of what type of copies to be managed, frequency of creating the copies, and/or durations for maintaining the copies for the given application 104. Moreover, in accordance with aspects of the present disclosure, the data protection policy may include certain additional user inputs, for example, tolerances and/or alternative copy tiers, which may aid the DPPMS 102 in dynamically tuning the data protection policy in the event of failures. In one example, the data protection policy defined corresponding to the application 104 may include one or more settings corresponding to parameters including, but not limited to, one or more of copy tiers, a data retention interval and a recovery point objective (RPO) for the copy tiers. The term "copy tiers" or "copy type" may represent types of copies to be managed for the application 104. Examples of the copy tiers or copy types may include, but are not limited to, a snapshot, a backup, and a cloud backup. Also, in some examples, the data protection policy may also include information regarding target device corresponding each of the copy tier. The target device may represent a device (e.g., a storage node) where a given copy type is stored.

The term "data retention interval" may refer to a duration for which a given copy tier is maintained (e.g., kept stored) for the application. In some examples, the data retention interval may be defined for each of the different copy tiers. Further, the term "recovery point objective" or RPO may refer to an interval for triggering a capture of a given type of copy. In other words, the RPO may also referred to as a frequency of capturing given type of copy. The RPO may also be defined for each of the different copy tiers. Additionally, in accordance with aspects of the present disclosure, the data protection policy may also include tolerances corresponding to one or more of the copy tiers, the data retention interval, or the RPO. Moreover, in some examples, the data protection policy may also include information regarding an alternative copy tier corresponding to one or more of the copy tier. The alternative copy tier for a given copy tier may represent a copy tier, target storage devices of which may be used to store the copies corresponding to the given copy tier in case no suitable target storage device is identified in the given copy tier. For example, if the snapshot is defined as an alternative copy tier for the backup, target storage devices corresponding to the copy tier—snapshot may be used to store the backup in case no suitable target storage device is identified for the copy tier-backup. Table-1 presented below represents an illustration of an example data protection policy.

TABLE 1

Example data protection policy

| Copy Tier | Target Storage Device | Tiering tolerance | Alt. Copy Tier | RPO Value | RPO Tolerance | Data Retention Interval (DRI) Value | DRI Tolerance |
|---|---|---|---|---|---|---|---|
| Snapshot | Primary storage | No [Local | No | 4 hours | 50% | 2 days | 50% |

TABLE 1-continued

Example data protection policy

| Copy | | | | RPO | | Data Retention Interval (DRI) | |
|---|---|---|---|---|---|---|---|
| Copy Tier | Target Storage Device | Tiering tolerance | Alt. Copy Tier | Value | RPO Tolerance | Value | DRI Tolerance |
| | node 114 | snapshot is mandatory post failover] | | | | | |
| Backup | First backup storage node 116 | Yes [Post failure continue protection with rest of the rules even if backup is not feasible] | Snapshot | Daily | 50% | 1 Month | 50% |
| Cloud backup | Cloud store 112 | No [Cloud backup is mandatory post failover] | No | Weekly | 0% | 3 Months | 0% |

In the events of failures, such as, but not limited to, the SAN path failure, the site failure (e.g., a failure of the primary site 106), the storage capacity exhaustion of the primary storage node 114 and/or the backup storage nodes 116, or the node-failures, the DPPMS 102 may dynamically tune the data protection policy in order to avoid implications like performance SLA violations, data compliance violations and copy creation failures, and the like. In particular, the DPPMS 102 may detect a failure associated with an application 104 that is protected via the data protection policy. The DPPMS 102 may determine a type of the failure and select, based on the type of the failure, at least one parameter of the data protection policy to be tuned in response to detection of the failure. Moreover, the DPPMS 102 may tune the settings (e.g., values) corresponding to the at least one selected parameter to adapt the data protection policy post the failure. By way of example, depending on the type of the failure, the DPPMS 102 may tune one or more of the copy tiers, the data retention interval, or the RPO (see FIG. 2). Additional details of the operations performed by the DPPMS 102 will be described in conjunction with methods described in FIGS. 4-8.

Figure 2:
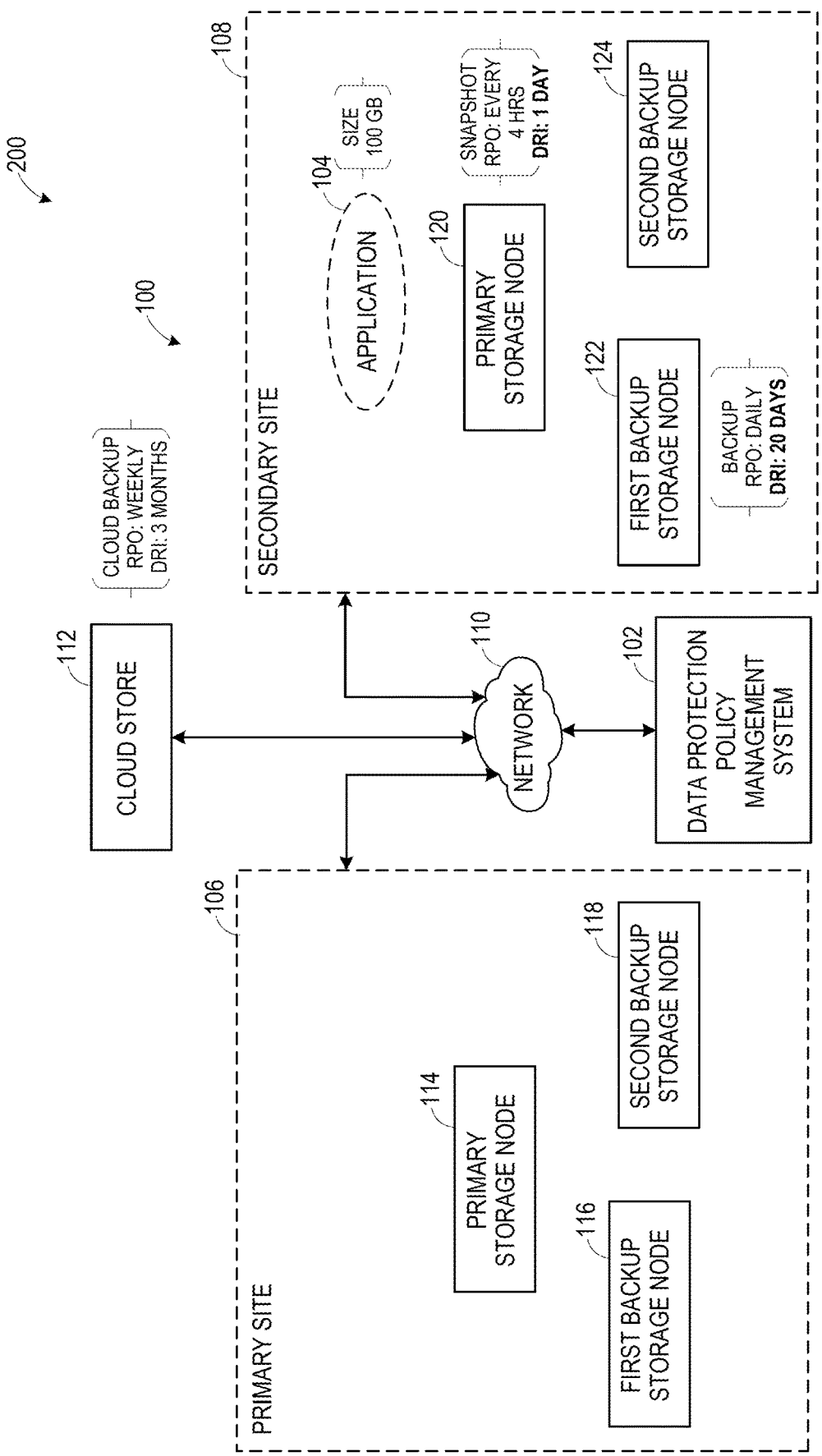
FIG. 2 depicts the networked system of FIG. 1 with updated data protection policy for the application, in accordance with an example.

Referring now to FIG. 2, a block diagram 200 of the networked system 100 of FIG. 1 with updated data protection policy for the application is presented, in accordance with an example. In particular, FIG. 2 depicts a scenario indicative of a site failure where the primary site 106 hosting the application 104 has encountered a failure. Accordingly, the application 104 is shown as failed-over to the secondary site 108 where the primary storage device 120 has been identified by the DPPMS 102 as a target storage device for hosting the application data of the application 104 and the snapshots corresponding to the application. Moreover, the first backup device 122 has been identified by the DPPMS 102 as a target storage device for storing backup of the application data corresponding to the application 104. Moreover, the DPPMS 102 continued maintain the cloud store 112 as a target location for storing the cloud backup.

In some examples, as will be described later in FIGS. 4-8, the DPPMS 102 has tuned the data protection policy based on the type of the failure (e.g., site failure, in this case) by tuning one or more of the copy tiers, the data retention intervals and the RPO for one or more copy tiers within the tolerances specified in the data protection policy (see Table-1). For example, while the primary storage node 120 is identified as the target device for storing the snapshots, due a limited available storage space in the primary storage node 120, the DPPMS 102 has tuned the data retention interval to 1 day from the originally specified value of 2 days (see Table-1) indicating that the data retention interval is compromised well within the data retention interval tolerance (referred to as a DRI tolerance) specified in the data protection policy. Moreover, a value of the data retention interval for the copy type—backup has been updated to 20 days in place of the originally specified value of 30 days (see FIG. 1 and Table-1). Such updated data retention interval is also well within the DRI tolerance corresponding to the copy type—backup specified in the data protection policy. On the other hand, the DPPMS 102 has maintained original policy specifications for the copy type—cloud backup.

As will be appreciated, the DPPMS 102, in some examples, may address various technological problems by dynamically tuning a data protection policy defined for a given application in an event of the failure. In some examples, the DPPMS 102 tunes the data protection policy in accordance with a type of a failure, user preferences (e.g. tolerances and/or alternative copy tiers) specified in the data protection policy and capabilities of a discovered target storage device or a secondary site hosting the application after the failure has happened. In particular, such dynamic tuning of the data protection policy minimizes of chances of the performance SLA violations, data compliance violations and copy creation failures, and the like. Additionally, the dynamic tuning of the data protection policy as effected by the DPPMS 102 may avoid or minimize manual interventions thereby saving cost and complexities.

Figure 3:
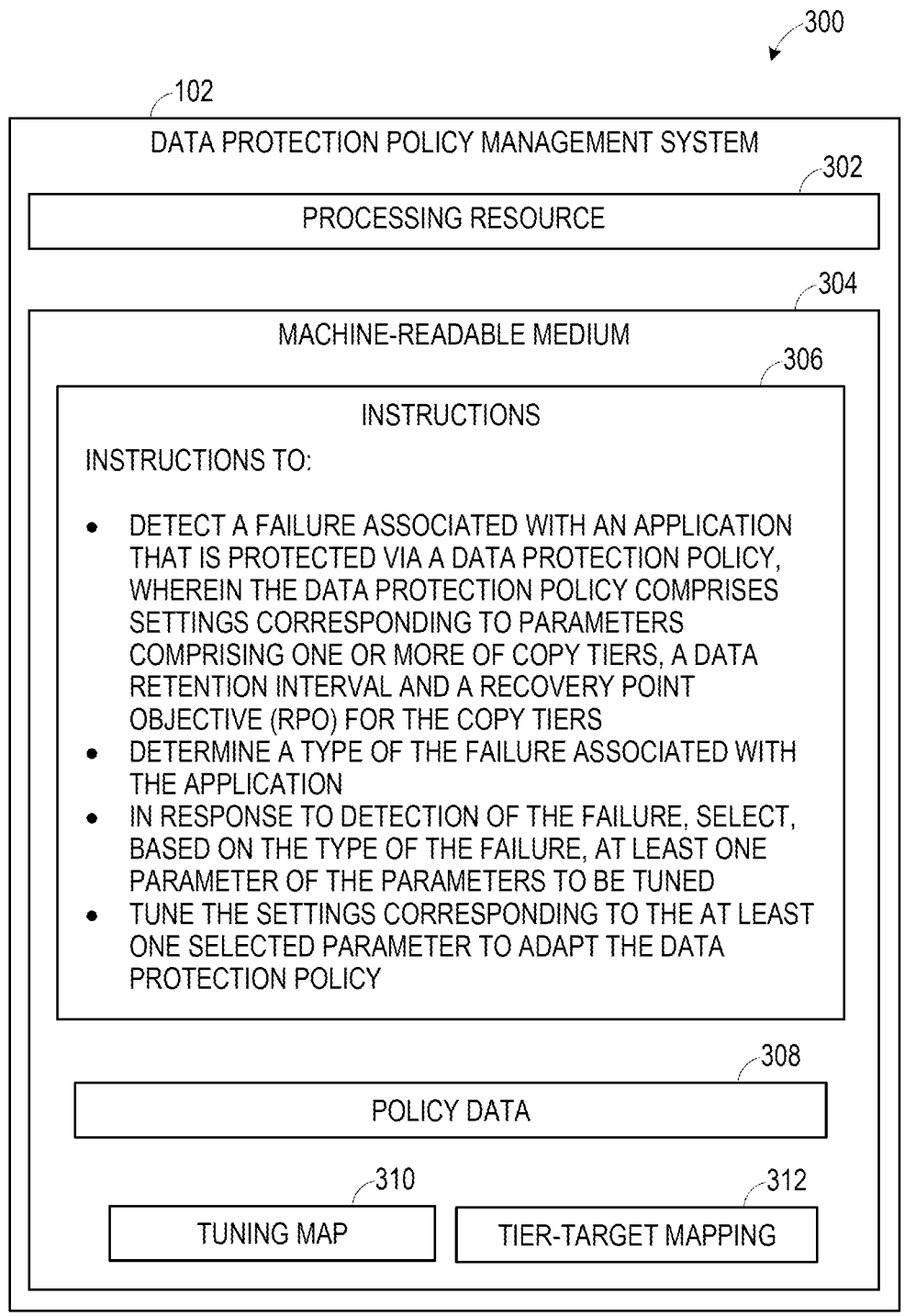
FIG. 3 depicts a block diagram of a DPPMS, in accordance with an example.

In the description hereinafter, structural and functional details of the DPPMS 102 will be described with reference to FIGS. 3-8. Referring now to FIG. 3, a block diagram 300 of the DPPMS 102 is presented, in accordance with an example. In some examples, the DPPMS 102 may include a processing resource 302 and a machine-readable medium 304. The machine-readable medium 304 may be any electronic, magnetic, optical, or other physical storage device that may store data and/or executable instructions 306. For example, the machine-readable medium 304 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 304 may be non-transitory. As described in detail herein, the machine-readable medium 304 may be encoded with the executable instructions 306 to perform one or more methods, for example, methods described in FIGS. 4-8.

Further, the processing resource 302 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 306 stored in the machine-readable medium 304, or combinations thereof. The processing resource 302 may fetch, decode, and execute the instructions 306 stored in the machine-readable medium 304 to tune the data protection policy upon detection of a failure. As an alternative or in addition to executing the instructions 306, the processing resource 302 may include at least one integrated circuit (IC), control logic, electronic circuits, or combinations thereof that include a number of electronic components for performing the functionalities intended to be performed by the DPPMS 102 (described further below). Moreover, in certain examples, where the DPPMS 102 may be implemented as a virtual machine or a containerized application, the processing resource 302 and the machine-readable medium 304 may represent a processing resource and a machine-readable medium of the hardware or a computing system that hosts the DPPMS 102 as the virtual machine or the containerized application.

In some examples, in addition to the instructions 306, the machine-readable medium 304 may store a policy data 308. The policy data 308 may include settings (e.g., values, tolerances, alternate tiers, etc.) corresponding to one or more parameters such as the copy tiers, the data retention interval, and the RPO. In addition, in some examples, the policy data 308 may include target devices corresponding to each of the copy tier defined in the data protection policy. A target device for a given copy type may represent a storage node where the given copy type is stored and maintained. In particular, the policy data 308 may include data presented in Table-1, for example. Also, in some examples, the machine-readable medium 304 may store a tuning map 310 including a mapping between a type of failure and parameters of the policy to be tuned with respect each type of failure. Table-2 presented below my represent an example data that may be stored in the tuning map 310.

TABLE 2

Example data of the tuning map 310

| Type of Failure | Parameters to be tuned |
| --- | --- |
| Site failure | Copy tiers, Data retention interval, RPO |
| Exhaustion of storage space | Data retention interval, RPO If RPO and data retention intervals cannot be set within defined respective tolerances, Tune copy tiers |
| Failure of storage node | Copy tiers, Data retention interval, RPO |
| SAN path failure | RPO |

In table-2, four types of failures and respective parameters to be tuned are listed for illustration purposes. In some examples, the tuning map 310 may include more or fewer number of types and corresponding parameters to be tuned. Also, in some examples, the DPPMS 102 may enable a user interface on a display device (not shown) through which an administrator of the application 104 can define, alter, and or remove the data protection policies and/or any content of the tuning map 310. For example, the administrator may choose to add or remove any type of failure and define/update corresponding parameters to be tuned in the tuning map 310 via such user interface enabled by the DPPMS 102.

Additionally, in some examples, the machine-readable medium 304 may store a tier-target mapping 312 including a mapping between the copy tiers and respective candidate target storage devices discovered based on scanning of the networked system 100. In certain examples, the DPPMS 102 may allow the administrator to define one or more candidate target storage devices for each of the copy tiers. The tier-target mapping 312 may be referenced by the processing resource 302 to identify a target storage device for one or more copy tiers post detection of the failure (described in greater detail in FIG. 6). Example tier-target mapping 312 is presented as a Table-3 below.

TABLE 3

Example tier-target mapping 312

| Copy Tier | Candidate Target Storage Devices |
| --- | --- |
| Snapshot | Primary storage nodes 114, 120, . . . |
| Backup | Backup storage nodes 116, 118, 122, 124, . . . |
| Cloud backup | Cloud store, . . . |

During operation, the processing resource 302 may execute one or more of the instructions 306 to monitor the networked system 100 for detection of any failure. Further, in response to the detection of the failure, the processing resource 302 may tune one or more of the parameters of the data protection policy as defined in the tuning map 310 based on the type of the failure. Details of the operations performed by the DPPMS 102 are described in conjunction with FIGS. 4 and 5.

In the description hereinafter, several operations performed by the DPPMS 102 will be described with help of flow diagrams depicted in FIGS. 4-8. For illustration purposes, the flow diagrams depicted in FIGS. 4-8 are described in conjunction with the networked system 100 of FIG. 1, however, the methods of FIG. 4-8 should not be construed to be limited to the example configuration of networked system 100 (e.g., with respect to quantity of sites, storage nodes, etc.). The methods described in FIGS. 4-8 include a plurality of blocks operations at which may be performed by a processor-based system such as, for example, the DPPMS 102. In particular, operations at each of the plurality of blocks may be performed by the processing resource 302 by executing one or more of the instructions 306 stored in the machine-readable medium 304 (see FIG. 2). In particular, the methods described in FIGS. 4-8 may represent an example logical flow of some of the several operations performed by the processing resource 302 to tune a data protection policy for the application 104 in an event of a failure. However, in some other examples, the order of execution of the blocks depicted in FIGS. 4-8 may be different than the order shown. For example, the operations at various blocks may be performed in series, in parallel, or a series-parallel combination.

Figure 4:
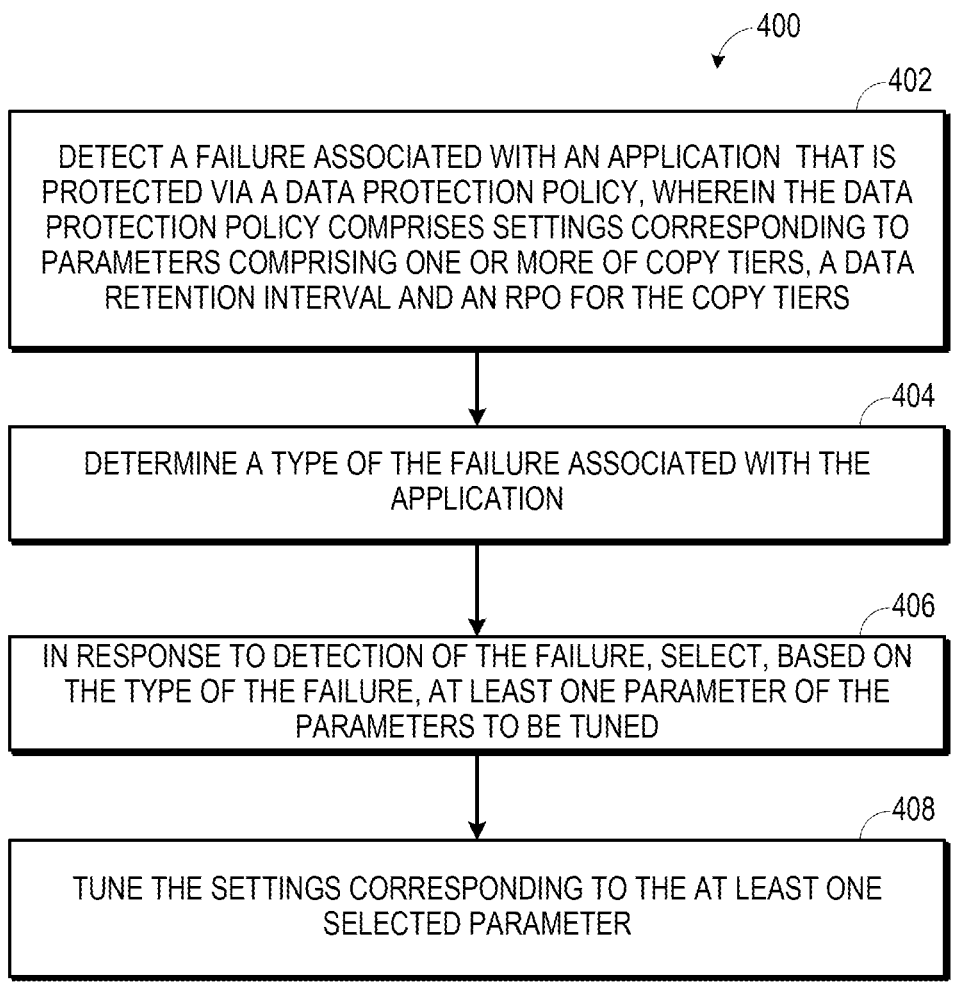
FIG. 4 is a flow diagram depicting a method for managing a data protection policy, in accordance with an example.

Turning now to FIG. 4, a flow diagram depicting a method 400 for managing a data protection policy in the event of a failure is presented, in accordance with an example. At block 402, the processing resource 302 may detect a failure associated with the application 104 that is protected via the data protection policy described in FIG. 1. As previously noted, the data protection policy may include settings corresponding to parameters comprising one or more of the copy tiers, the data retention interval and the RPO for the copy tiers.

In one example, the processing resource 302 of the DPPMS 102, may continuously monitor the performance of the application 104, the entire primary site 106, and one or more of the primary storage node 114, the first backup storage node, and the cloud store 112 to determine whether the application 104, the primary site 106, and one or more of the primary storage node 114, the first backup storage node, and the cloud store 112 are functioning normally and the data protection policy is not compromised. In order to perform such monitoring, the processing resource 302 may execute one or more of the instructions 306 to analyze one or more events reported from the application 104, or one or more of the primary storage node 114, the first backup storage node, and the cloud store 112. In certain examples, the application 104, or one or more of the primary storage node 114, the first backup storage node, and the cloud store 112 may communicate a notification indicative of the failure to the DPPMS 102. The processing resource 302 may determine that the application 104, the primary site 106, or one or more of the primary storage node 114, the first backup storage node 116, and the cloud store 112 has encountered the failure based on the received notification or/and based on the analysis of the events reported thereto.

Further, at block 404, the processing resource 302 may determine a type of the failure. Examples type of the failure may include, but are not limited to, the site failure, the exhaustion of storage space, the node failure, or a SAN path failure. The processing resource 302 may determine the type of the failure based on the notifications and/or analysis of the events reported from one or more of the application 104, the primary site 106, or one or more of the primary storage node 114, the first backup storage node 116, and the cloud store 112. Furthermore, in some examples, at block 406, the processing resource 302 may select, based on the type of the failure, at least one parameter of the parameters to be tuned. In some examples, to select the at least one parameter to be tuned, the processing resource 302 may access the tuning map 310 (see FIG. 3 and Table-2) stored in the machine-readable medium 304 and find parameters to be tuned corresponding to the type of failure. For example, if the type failure determined by the processing resource 302 is the site failure (e.g., the failure of the primary site 106) or the node failure (e.g., failure of the first backup storage node 116), the processing resource 302 may select the copy tiers, the data retention interval, and the RPO as the parameters to be tuned. Similarly, the parameters—the data retention interval and the RPO may be selected if the type of the failure detected is the exhaustion of storage space. Further, the parameter—the RPO may be selected to be tuned if the type of the failure detected is the SAN path failure.

Once the parameters to be tuned are selected, at block 408, the processing resource 302 may tune the settings corresponding to the at least one selected parameter to adapt the data protection policy. In the example of the failure type being the site failure or the node failure, the processing resource 302 may tune the settings corresponding to the copy tiers, the data retention interval, and the RPO defined in the data protection policy as the application 104 have been failed-over to the secondary site 108. Accordingly, the processing resource 302 may tune the copy tiers, the data retention interval, and the RPO based on capabilities of target devices identified from the secondary site 108 and the tolerances defined in the data protection policy corresponding to each copy tiers. Additional details of tuning the copy tiers, the data retention interval, and the RPO are described in conjunction with FIGS. 6, 7, and 8, respectively.

Figure 5:
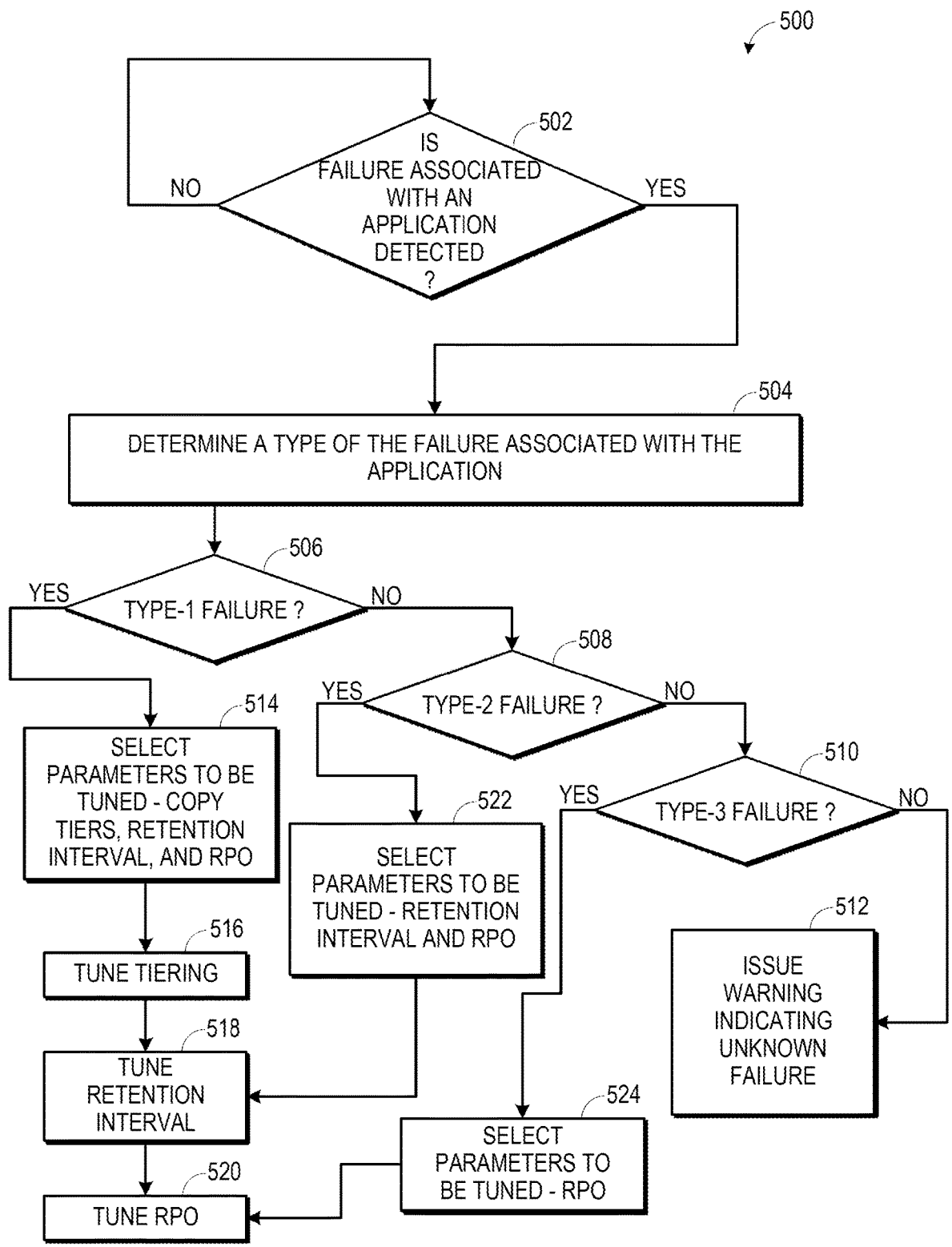
FIG. 5 is a flow diagram depicting a method for managing a data protection policy, in accordance with another example.

Moving now FIG. 5, a flow diagram depicting a method 500 for managing the data protection policy associated with the application 104 is presented, in accordance with another example. At block 502, the processing resource 302 may perform a check to determine whether a failure is detected. Details of the operations performed by the processing resource 302 to detect the failure have been described in conjunction with FIG. 4. At block 502, if it is determined that no failure is detected, the processing resource 302 may continue to perform a check at block 502. However, at block 502, if it is determined that the failure is detected, the processing resource 302, at block 504, may determine a type of the failure based on the tuning map 310 as previously described.

Further, in some examples, the processing resource 302 may perform several checks to select the parameters of the data protection policy which are to be tuned. For example, at 506, the processing resource 302 may perform a check to determine whether the type of the failure determined at block 504 is a type-1 failure (e.g., any of a site failure or a storage node failure). At block 506 if it is determined that the type of the failure determined at block 504 is not the type-1 failure, the processing resource 302, at block 508, may perform a check to determine whether the type of the failure determined at block 504 is a type-2 failure (e.g., an exhaustion of storage space). At block, 508 if it is determined that the type of the failure determined at block 504 is not the type-2 failure, the processing resource 302, at block 510, may perform a check to determine whether the type of the failure determined at block 504 is a type-3 failure (e.g., a SAN path failure). In some examples, the processing resource 302 may perform several such checks to ascertain the type of the failure, although only three such checks have been illustrated herein. In case no match for the failure type is identified, the processing resource 302 may issue a warning. For example, at block 510 if it is determined that the type of the failure determined at block 504 is not the type-3 failure, the processing resource 302, at block 512, may issue a warning indicating that the failure type is unknown and manual intervention may be required to tune the data protection policy.

Referring again to block 506, if it is determined that the type of the failure determined at block 504 is the type-1 failure, the processing resource 302, at block 514, may select parameters to be tuned corresponding to the determined type of failure based on a lookup in the tuning map 310. For example, if the type of failure determined at block 504 is the site failure or the storage node failure (which is type-1 failure), the processing resource 302 may select copy tiers, the data retention interval, and the RPO as the parameters to be tuned. Once the parameters to be tuned are selected, the processing resource 302 may adjust values/settings corresponding to the selected parameters by executing one or more of the instructions 306. For example, at block 516, the processing resource 302 may tune the parameter—copy tiers defined in the data protection policy. Further, at block 518, the processing resource 302 may tune the parameter—data retention interval defined in the data protection policy. Furthermore, at block 520, the processing resource 302 may tune the parameter—RPO defined in the data protection policy. Detailed methods of tuning the copy tiers, the data retention interval, and the RPO are described in conjunction with FIGS. 6-8.

Referring again to block 508, if it is determined that the type of the failure determined at block 504 is the type-2 failure, the processing resource 302, at block 522, may select parameters to be tuned corresponding to the determined type of failure based on a lookup in the tuning map 310. For example, if the type of failure determined at block 504 is the exhaustion of storage space (which is type-2 failure), the processing resource 302 may select the data retention interval and the RPO as the parameters to be tuned. Once the parameters to be tuned are selected, the processing resource may 302 adjust values/settings corresponding to the selected parameters by executing one or more of the instructions 306. For example, the processing resource 302 may tune the data retention interval and the RPO defined in the data protection policy respectively at blocks 518 and 520.

Referring again to block 510, if it is determined that the type of the failure determined at block 504 is the type-3 failure, the processing resource 302, at block 524, may select parameters to be tuned corresponding to the determined type of failure based on a lookup in the tuning map 310. For example, if the type of failure determined at block 504 is the SAN path failure (which is type-3 failure), the processing resource 302 may select the RPO as the parameters to be tuned. Once the parameters to be tuned are selected, the processing resource 302 may adjust values/settings corresponding to the selected parameters by executing one or more of the instructions 306. For example, the processing resource 302 may tune the RPO at block 520.

Figure 6:
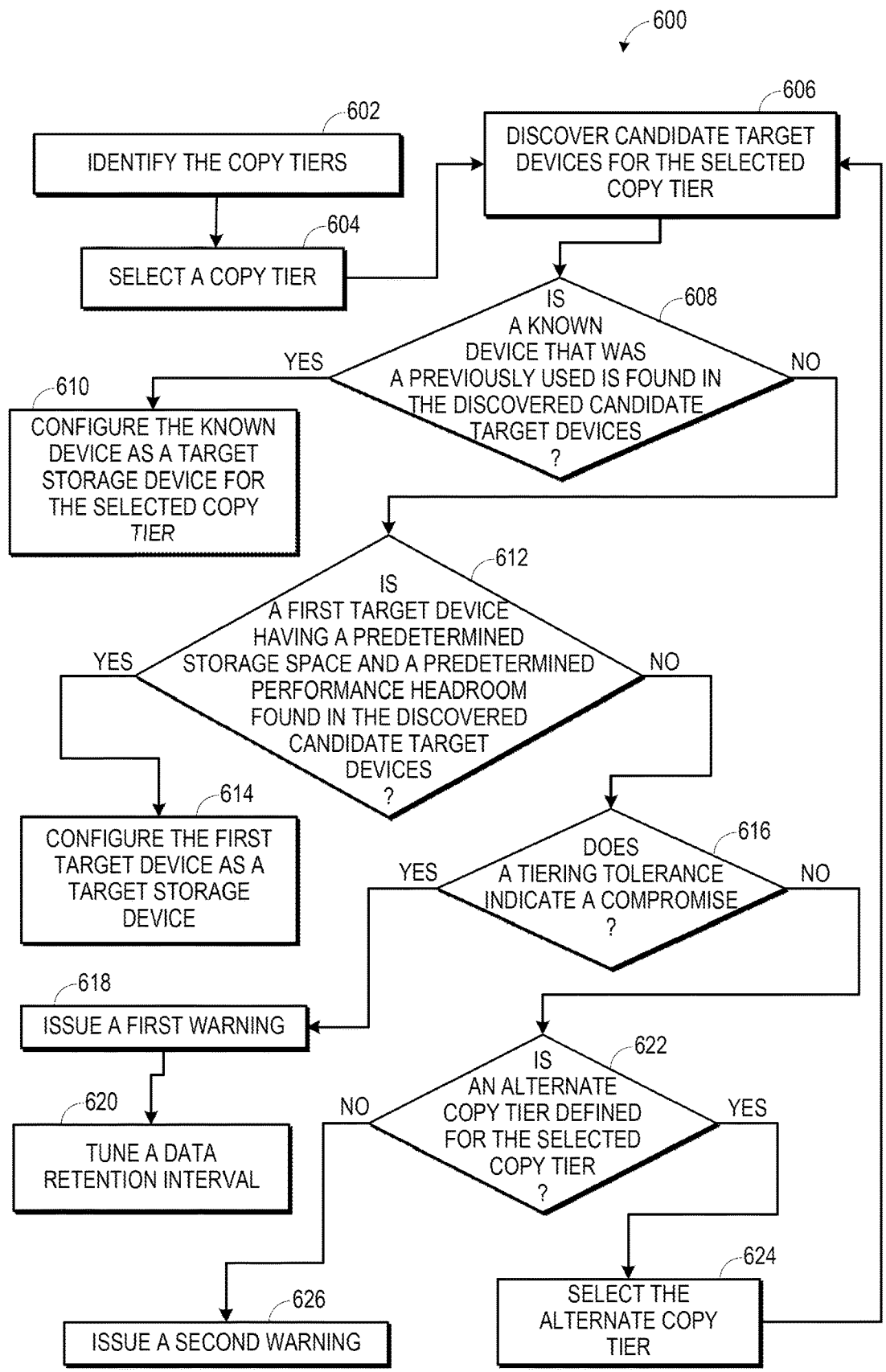
FIG. 6 is a flow diagram depicting a method for tuning copy tiers in a data protection policy, in accordance with another example.

Moving now to FIG. 6, a flow diagram depicting a method 600 for tuning copy tiers in the data protection policy is presented, in accordance with another example. At block 602, the processing resource 302 may identify the copy tiers defined in the data protection policy by analyzing the policy data 308 stored in the machine-readable medium 304. In one example, based on the policy data 308, the processing resource 302 may determine that the data protection policy corresponding to the application 104 protects the application data in three the copy tiers, namely, the snapshots, the backup, and the cloud backup (see Table-1). Further, at block 604, the processing resource 302 may select a copy tier to be tuned from the identified copy tiers. In one example, the processing resource 302 may perform operations at one or more of blocks 606-626 for the selected copy tier. Once operations at one or more of the blocks 606-626 are performed for the selected copy tier, the processing resource 302 may select another copy tier from the copy tiers identified at block 602. Likewise, the processing resource 302 may perform operations at one or more of the blocks 606-626 for all copy tiers identified at block 602.

At block 606, the processing resource 302 may scan the networked system 100 (e.g., the secondary side in case of the failure type—site failure, for example) to discover one or more candidate target storage devices for the selected copy tier. In some examples, the processing resource 302 may also update the tier-target mapping 312 to list the discovered one or more candidate target storage devices for the selected copy tier. Further, at block 608, the processing resource 302 may perform a check to identify, for the selected copy tier, a known target storage device of the one or more candidate target storage devices that was previously used for the selected copy tier. For example, the known target storage device might have been used as a target storage device for the selected copy tier in one or more past failover instances. If such previously used known target storage device is found in the discovered candidate target storage devices listed in the tier-target mapping 312, it is better to use such known target storage device for the selected copy tier. Accordingly, at block 610, configure the known target storage device as a target storage device for the selected copy tier. Accordingly, the copy of the application data as per selected copy tier will be stored in the known target storage device. For example, as depicted in FIG. 2, for the copy tier—cloud backup, the cloud store 112 is continued to be maintained as the target storage device.

Further, in some examples, at block 612, the processing resource 02 may perform a check to identify a first target device having a predetermined storage space and a predetermined performance headroom (e.g., an input-output performance headroom) from the one or more candidate target storage devices. In some examples, the candidate target storage devices may expose, to the DPPMS 102, their respective performance metrics including, but not limited to, storage pool used capacity, overall system level Input/output operations per second (IOPS), bandwidth, latency and saturation. For each of the candidate target storage devices, the processing resource 302 may determine available storage space and the performance headroom based on one or more of the exposed respective performance metrics. By way of example, for a given candidate target storage device, the processing resource 302 may determine the available storage space based on the storage pool used capacity and/or the bandwidth associated with the given candidate target storage device. Further, in some examples, for the given candidate target storage device, the processing resource 302 may determine the performance headroom based on one or more of the overall system level IOPS, the bandwidth, the latency, or the saturation. Once the available storage space and the performance headroom are determined for the given candidate target storage device, the processing resource 302 may compare the determined available storage space and the determined performance headroom with the predetermined storage space and the predetermined performance headroom, respectively, to determine whether the given candidate target storage device can be identified as the first target device having the predetermined storage space and the predetermined performance headroom.

In one example, the predetermined storage space and the predetermined performance headroom may include a first predetermined storage space size and a first predetermined performance headroom, respectively. The first predetermined storage space size and the first predetermined performance headroom may be determined based on the data retention period and the RPO originally defined in the data protection policy. Accordingly, the first predetermined storage space size and the first predetermined performance headroom may be sufficient to achieve the data retention period and the RPO originally defined in the data protection policy. Therefore, in some examples, if the first target storage device having the first predetermined storage space size and the first predetermined performance headroom is identified, the data retention interval and the RPO are not required to be adjusted.

In another example, the predetermined storage space and the predetermined performance headroom may include a second predetermined storage space size and a second predetermined performance headroom, respectively. The second predetermined storage space size and the second predetermined performance headroom may be determined based on the data retention period and the RPO originally defined in the data protection policy and the respective tolerances (e.g., the DRI tolerance and the RPO tolerance).

Accordingly, the second predetermined storage space size and the second predetermined performance headroom may be sufficient to achieve the data retention period and the RPO originally defined in the data protection policy within the respectively defined tolerances. Therefore, in some examples, if the first target storage device having the second predetermined storage space size and the second predetermined performance headroom is identified, the data retention interval and the RPO may be adjusted.

In some examples, in identifying the first target device, the processing resource 302 may implement a first-fit criteria with respect to the performance headroom and a best-fit criteria with respect to the storage space. The first-fit criteria for performance headroom may include identifying a candidate target storage device having the performance headroom greater than or equal to the predetermined performance headroom as the first target storage device. As per the first-fit criteria, once the candidate target storage device having the performance headroom greater than or equal to the predetermined performance headroom is identified, the processing resource 302 may stop checking other candidate target storage devices for the performance headroom resulting in faster discovery of the first target device.

Further, in one example, the best-fit criteria with respect to the storage space may include identifying a candidate target storage device having the available storage space that closely matches with the predetermined storage space. For example, if the predetermined storage space that is required is 10 GB and there are two candidate target storage devices having available storage spaces of 11 GB and 15 GB, respectively, the processing resource 302 may select the candidate target storage device having 11 GB of the available storage space as the first target storage device. As will be appreciated, selecting a target storage device with the best-fit criteria for the storage space, may result in saving of storage space.

In another example, the best-fit criteria with respect to the storage space may include identifying a candidate target storage device having a maximum available storage. For example, if the predetermined storage space that is required is 10 GB and there are two candidate target storage devices having available storage spaces of 11 GB and 15 GB, respectively, the processing resource 302 may select the candidate target storage device having 15 GB of the available storage space as the first target storage device.

Accordingly, the processing resource 302 may select a candidate target storage device as the first target storage device that satisfies the first-fit criteria with respect to the performance headroom and the best-fit criteria with respect to the storage space. In some other examples, the selection of the first target storage device may also be performed based on additional or alternative one or more criteria, without limiting the scope of the present disclosure.

At block 612, if the first target storage device having the predetermined storage space and the predetermined performance headroom is identified, at block 614, the processing resource 302 may configure the first target device as a target storage device for the selected copy tier. At block 612, if the first target having the predetermined storage space and the predetermined performance headroom is not identified, at block 616, the processing resource 302 may perform another check to determine if a tiering tolerance defined in the data protection policy allows compromise in data protection for the selected copy tier. In order to perform such check at block 616, the processing resource 302 may check the policy data 308 to verify the tiering tolerance. For example, as depicted in Table-1, for the copy tier—snapshot and cloud copy, the data protection policy does not allow any compromise. Whereas, for the copy tier backup, the data protection policy indicates that compromise can be made, e.g., in case backup is not feasible, protection under backup may be skipped. Accordingly, at block 616, if it is determined that the tiering tolerance allows compromise in protection for the selected copy tier, at block 618, the processing resource 302 may issue a first warning indicating that the protection of the application data may be continued without the protection as per the selected copy tier. Further, at block 620, the processing resource 302 may tune the data retention interval for the elected copy tier. Details of tuning the data retention interval are described in conjunction with FIG. 7.

Referring again to block 616, if it is determined that the tiering tolerance does not allow compromise in protection for the selected copy tier, the processing resource 302, at block 622, may perform another check to determine an alternative copy tier corresponding to the selected copy tier is defined in the data protection policy. The processing resource 302 may access the policy data 308 (see Table-1 as well) to determine if an alternative copy tier is mentioned in the data protection policy corresponding to the selected tier. At block 622, if it is determined that alternative copy tier corresponding to the selected copy tier is defined in the data protection policy, at block 624, the processing resource 302 may select the alternative copy tier and an execution control may be passed to block 606 where, the processing resource 302 may scan the networked system 100 (in particular, the secondary site 108 in case of the failure type—site failure, for example) to discover, for the selected copy tier (e.g., the alternative copy tier corresponding to the selected copy tier), one or more candidate target storage devices. However, at block 622, if it is determined that no alternative copy tier corresponding to the selected copy tier is defined in the data protection policy, the processing resource 302, at block 626 may issue warning indicting that protection cannot be continued for the selected copy tier.

Figure 7:
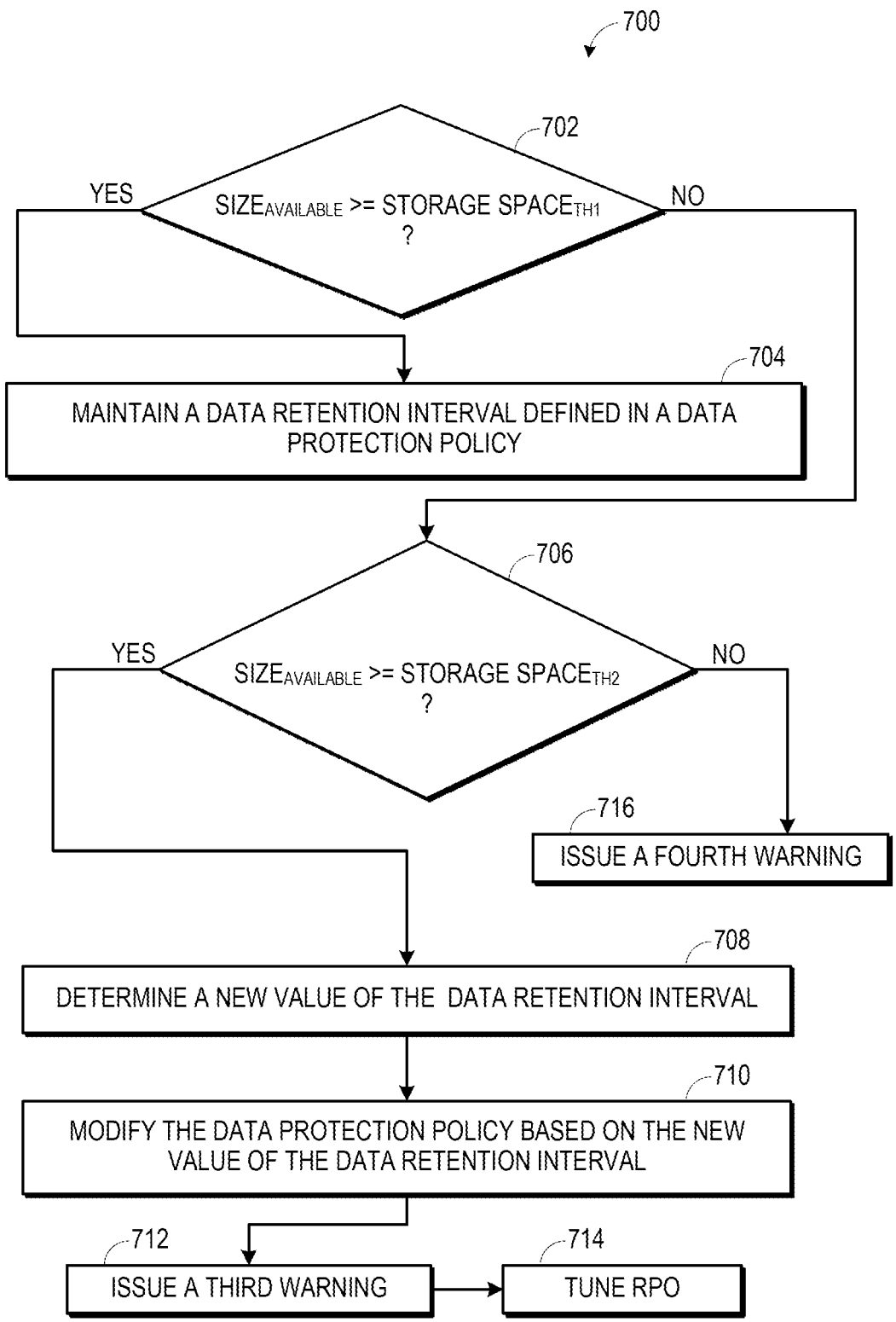
FIG. 7 is a flow diagram depicting a method for tuning a data retention interval in a data protection policy, in accordance with an example.

Turning now to FIG. 7, a flow diagram depicting a method 700 for tuning the data retention interval in the data protection policy is presented, in accordance with an example. At block 702, the processing resource 302 may perform a check to determine if a size of an available storage space ($SIZE_{AVAILABLE}$) in a target storage device corresponding to the given copy tier is greater than or equal to a first threshold storage space ($STORAGE\ SPACE_{TH1}$) required to retain a first predetermined number of copies for the data retention interval defined in the data protection policy. In particular, the first predetermined number of copies for the data retention interval may be determined based on the RPO for the given copy tier, a size of the application data, and the data retention interval. For example, for the copy tier—backup, if a size of the application data 100 GB and a size of the backup being same as the size of the application data (i.e., 100 GB), the RPO of "daily" and the data retention interval of 1 month (e.g., 30 days), the first predetermined number of copies may be determined as being 30 copies. In some examples, the processing resource 302 may determine a size of the first threshold storage space based on the first predetermined number of copies. For example, the storage space needed to store the 30 copies may be equal to 3000 GB, considering each backup copy having size of 100 GB. Accordingly, the processing resource 302 may determine the first threshold storage space as being 3000 GB. It is to be noted that above described calculation of the first threshold storage space is for the purpose of simple illustration and should not construed to be limiting. Other methods of calculating of the first threshold storage space may also be implemented by the processing resource 302, without limiting the scope of the ongoing disclosure.

At block 702, if it is determined that the size of the available storage space in the target storage device is greater than or equal to the first threshold storage space, the processing resource 302, at block 704, may choose to maintain (i.e., does not alter) the data retention interval defined in the data protection policy for the target storage device. However, at block 702, if it is determined that the size of the available storage space in the target storage device is less than the first threshold storage space, the processing resource 302, at block 706, may perform another check to determine whether the size of the available storage space in the target storage device is greater than or equal to a second threshold storage space (STORAGE SPACE$_{TH2}$) required to retain a second number of copies accommodated within a DRI tolerance defined in the data protection policy. By way of example, for the copy tier—backup, the data protection policy defines the DRI tolerance as "50%," indicating that the data retention interval can be compromised up-to 50%. The second threshold storage space may be determined based on the DRI tolerance. For example, the DRI tolerance of 50% for the copy tier backup, the data retention interval may be brought-down to about 15 days which can lead to maximum of 15 copies to be retained. The retention of 15 backup copies may consume storage space of 1500 GB. Accordingly, the second threshold storage space may be determined as being 1500 GB. It is to be noted that above described calculation of the second threshold storage space is for the purpose of simple illustration and should not construed to be limiting. Other methods of calculating of the second threshold storage space may also be implemented by the processing resource 302, without limiting the scope of the ongoing disclosure.

At block 706, if it is determined that the size of the available storage space in the target storage device is greater than or equal to the second threshold storage space, the processing resource 302, at block 708, may determine a new value of the data retention interval based on the data retention interval defined in the data protection policy and a size of the available memory in the target storage device. For example, if the size of the available storage space in the target storage device is 2000 GB (which is less than the first threshold storage space, but is greater than the second threshold storage space) and with the data retention interval defined in the data protection policy being 1 month (e.g., 30 days), the processing resource 302 may determine the new value of the data retention interval as 20 days (i.e., 2000 GB×30 days÷3000 GB). Further, at block 710, the processing resource 302 may modify the data protection policy based on the new value of the data retention interval. In particular, the processing resource 302 may change the value of the data retention interval to the new value of the data retention interval determined at block 708, Moreover, at block 712, the processing resource may issue a third warning indicating that data protection for the application will be continued with the revised/new value of the data retention interval within the data retention tolerance. Additionally, at block 714, the processing resource 302 may tune the RPO for the given copy tier. Details of tuning the RPO are described in conjunction with FIG. 8.

Referring back to block 706, if it is determined that the size of the available storage space in the target storage device is less than the second threshold storage space, the processing resource 302, at block 716, may issue a fourth warning indicating that the data protection cannot be continued for the given copy tier.

Figure 8:
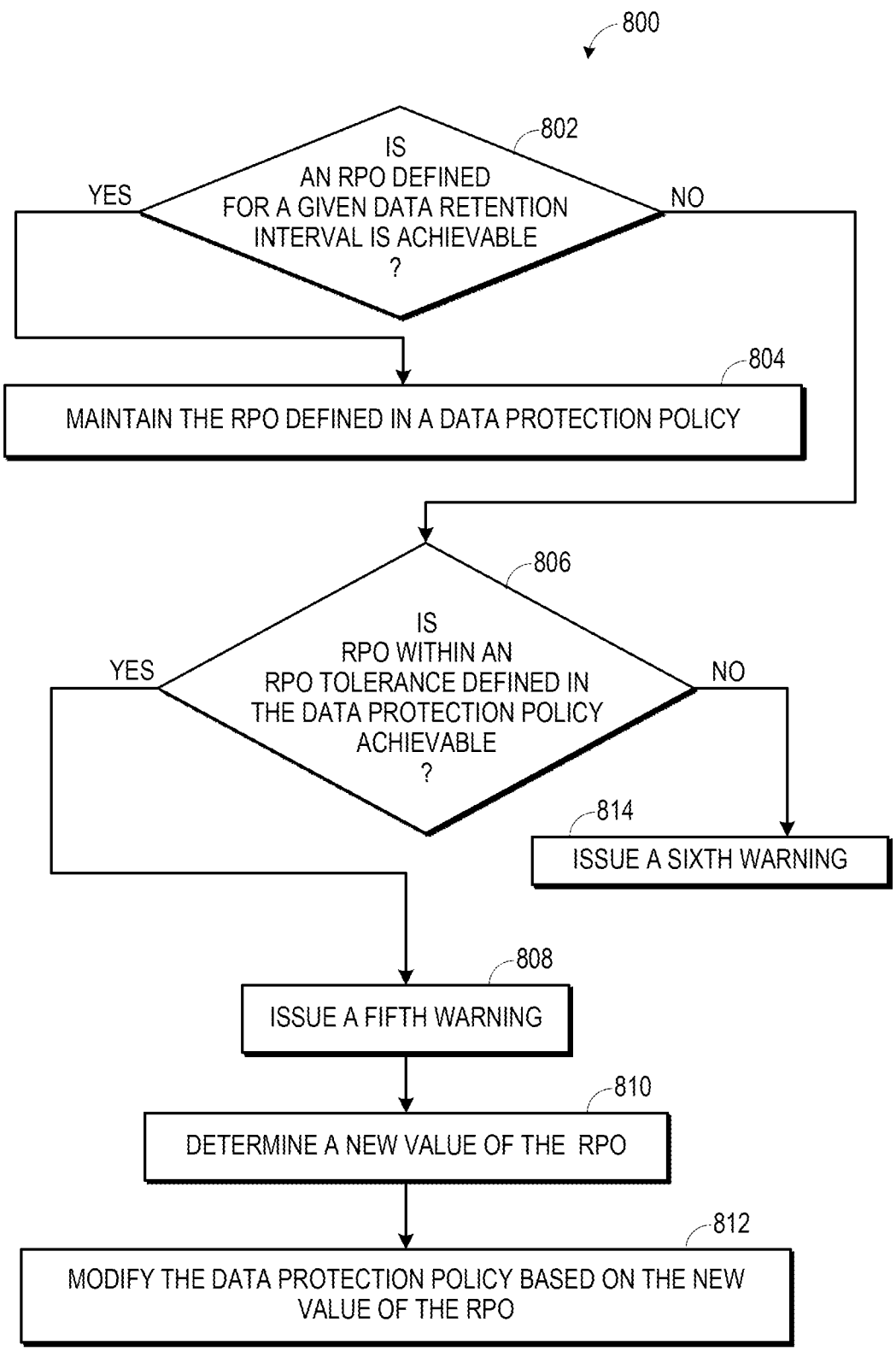
FIG. 8 is a flow diagram depicting a method for tuning a recovery point objective (RPO) in a data protection policy, in accordance with an example.

Turning now to FIG. 8, a flow diagram depicting a method 800 for tuning the RPO in the data protection policy is presented, in accordance with an example. At block 802, the processing resource 302 may perform a check to determine whether a setting (e.g., value) of the RPO defined in the data protection policy is achievable for a given data retention interval associated with the given copy tier. Continuing the previous example described in FIG. 7, for the data retention interval of 20 days (e.g., the newly updated value that can accommodate a maximum of 20 copies for 20 days), indicates that the RPO—Daily, defined in the may be feasible. At block, 802, if it is determined that the value of the RPO defined in the data protection policy is achievable for the given data retention interval associated with the given copy tier, at block 804, the processing resource 302 may choose to maintain (i.e., does not alter) the RPO defined in the data protection policy for the given copy tier. However, at block 802, if it is determined that the value of the RPO defined in the data protection policy is not achievable for the given data retention interval associated with the given copy tier, the processing resource 302, at block 806, may perform another check to determine if the RPO within an RPO tolerance defined in the data protection policy is achievable. The processing resource 302 may access the policy data to identify the RPO tolerance and determine a frequency of capturing the copy type within the defined RPO tolerance. In case of the copy type-backup, the RPO tolerance is defined as being 50% indicating that the RPO can be made as low as 2 days (i.e., capturing backup at every two days.)

At block 806, if it is determined that the RPO within the RPO tolerance is achievable, at block 808, the processing resource 302 may issue a fifth warning indicating that a protection for the given copy tier can be continued with compromised RPO well within the RPO tolerance defined in the data protection policy. Further, at block 810, the processing resource 302 may determine a new value of the RPO based on the available storage space (SIZE$_{AVAILABLE}$), a size of the copy-type (e.g., backup), and the new value of the retention period. Continuing with the above example where the available storage space is determined as being 2000 GB, the size of the backup being 100 GB, and the new value of the retention period being 20 days, the new value of the RPO may be determined as being 1 day (i.e., 20 days×100 GB÷2000 GB). Further, at block 812, the processing resource 302 may modify the data protection policy based on the new value of the RPO. In particular, the processing resource 302 may change the value of the RPO to the new value of the RPO determined at block 810. Referring back to block 806, if it is determined that the RPO within the RPO tolerance is not achievable, at block 814, the processing resource 302 may issue a sixth warning indicating that protection for the given copy tier cannot be continued.

Figure 9:
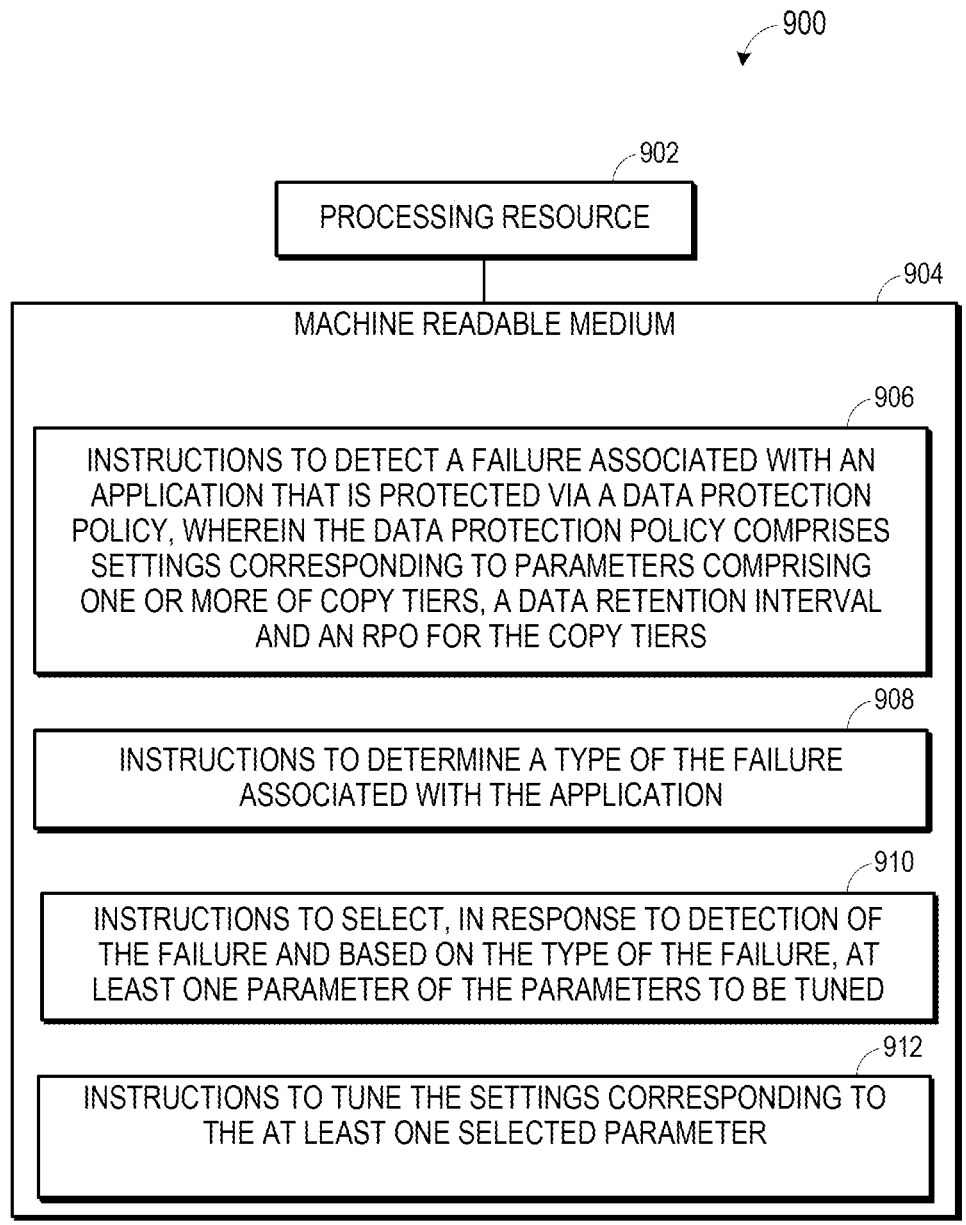
FIG. 9 is a block diagram depicting a processing resource and a machine-readable medium encoded with example instructions to tune a data protection policy, in accordance with an example.

Moving to FIG. 9, a block diagram 900 depicting a processing resource 902 and a machine-readable medium 904 encoded with example instructions to tune a data protection policy upon detection of a failure, in accordance with an example. The machine-readable medium 904 may be non-transitory and is alternatively referred to as a non-transitory machine-readable medium 904. As described in detail herein, the machine-readable medium 904 may be encoded with executable instructions 906, 908, 910, and 912 (hereinafter collectively referred to as instructions 906-912) for performing the method 400 described in FIG. 4. Although not shown, in some examples, the machine-readable medium 904 may be encoded with certain additional executable instructions to perform one or more of the methods described in FIGS. 5-8, and/or any other operations performed by the DPPMS 102, without limiting the scope of the present disclosure. In some examples, the machine-readable medium 904 may be accessed by the processing resource 902. In some examples, the processing resource 902 may represent one example of the processing resource 302 of the DPPMS 102. Further, the machine-readable medium 904 may represent one example of the machine-readable medium 304 of the DPPMS 102. In some examples, the processing resource 902 may fetch, decode, and execute the instructions 906-912 stored in the machine-readable medium 904 tune the data protection policy corresponding to the application 104 upon detection of the failure.

The instructions 906 when executed by the processing resource 902 may cause the processing resource 902 to detect a failure associated with the application 104 that is protected via the data protection policy including settings corresponding to parameters such as the copy tiers, the data retention interval and the RPO for the copy tiers. Further, the instructions 908 when executed by the processing resource 902 may cause the processing resource 902 to determine a type of the failure associated with the application 104. Furthermore, the instructions 910 when executed by the processing resource 902 may cause the processing resource 902 to select, based on the type of the failure, at least one parameter of the parameters to be tuned. Moreover, the instructions 912 when executed by the processing resource 902 may cause the processing resource 902 to tune the settings corresponding to the at least one selected parameter to adapt the data protection policy.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A data protection policy management system, comprising:
   a processing resource comprising a hardware processor; and
   a non-transitory machine-readable medium storing instructions that, when executed by the processing resource, cause the processing resource to:
     detect a failure associated with an application that is protected with a data protection policy, wherein the data protection policy comprises settings corresponding to a plurality of parameters comprising copy tiers, data retention intervals for the copy tiers, and recovery point objectives (RPOs) for the copy tiers;
     determine a type of the failure associated with the application;
     in response to detecting the failure, select, based on the type of the failure, at least one parameter to be tuned from among the plurality of parameters, wherein the selecting comprises performing a lookup of a mapping between different types of failures and corresponding different subsets of the plurality of parameters, wherein the mapping maps a first type of failure to a first subset of the plurality of parameters, and maps a second type of failure to a second subset of the plurality of parameters, the first type of failure being different from the second type of failure, and the first subset of the plurality of parameters being different from the second subset of the plurality of parameters; and
     tune at least one setting corresponding to the at least one selected parameter.

2. The data protection policy management system of claim 1, wherein the type of the failure comprises one or more of a storage node failure, a storage area network (SAN) path failure, a site failure, or a storage capacity exhaustion of one or more a storage devices associated with the application.

3. The data protection policy management system of claim 1, wherein the instructions when executed cause the processing resource to tune the at least one setting further based on tolerances defined in the data protection policy.

4. The data protection policy management system of claim 1, wherein, to tune a setting corresponding to the copy tiers, the instructions when executed cause the processing resource to:
   select a copy tier from the copy tiers; and
   discover, for the selected copy tier, one or more candidate target storage devices.

5. The data protection policy management system of claim 4, wherein the instructions when executed cause the processing resource to:
   identify, for the selected copy tier, a known target storage device of the one or more candidate target storage devices that was previously used for the selected copy tier; and
   configure the known target storage device as a target storage device for the selected copy tier.

6. A non-transitory machine-readable medium comprising instructions that, when executed by a processing resource comprising a hardware processor, cause the processing resource to:
   detect a failure associated with an application that is protected with a data protection policy, wherein the data protection policy comprises settings corresponding to a plurality of parameters, the plurality of parameters comprising copy tiers and at least another parameter;
   determine a type of the failure associated with the application;
   based on the type of the failure, select, from among the plurality of parameters, the copy tiers to tune; and
   tune settings corresponding to the copy tiers by:
     selecting a copy tier from the copy tiers,
     for the selected copy tier,
       discovering candidate target storage devices;
       checking to identify a first target storage device having a predetermined storage space and a predetermined performance headroom from the candidate target storage devices;
       if the first target storage device having the predetermined storage space and the predetermined performance headroom is identified by the checking, configuring the first target storage device as a target storage device for the selected copy tier; and if the first target storage device having the predetermined storage space and performance headroom is not identified by the checking,
determining if a tiering tolerance defined in the data protection policy allows compromise in protection for the selected copy tier,
in response to determining that the tiering tolerance does not allow compromise in protection for the selected copy tier, determining if an alternative copy tier corresponding to the selected copy tier is defined in the data protection policy, and
in response to determining that the alternative copy tier corresponding to the selected copy tier is defined in the data protection policy, scanning a networked system to discover candidate target storage devices belonging to the alternative copy tier.

7. The non-transitory machine-readable medium of claim 6, wherein the instructions when executed cause the processing resource to tune a data retention interval for the selected copy tier in response to determining that the tiering tolerance defined in the data protection policy allows compromise in protection for the selected copy tier.

8. A data protection policy management system, comprising:
a processing resource comprising a hardware processor; and
a non-transitory machine-readable medium storing instructions that, when executed by the processing resource, cause the processing resource to:
detect a failure associated with an application that is protected with a data protection policy, wherein the data protection policy comprises settings corresponding to a plurality of parameters comprising copy tiers and data retention intervals for the copy tiers;
determine a type of the failure associated with the application;
based on the type of the failure, select a first data retention interval of the data retention intervals in the data protection policy to be tuned for a given copy tier of the copy tiers; and
tune settings corresponding to the first data retention interval by:
determining if a size of an available storage space in a target storage device corresponding to the given copy tier is greater than or equal to a first threshold storage space required to retain a first predetermined number of copies for the first data retention interval;
in response to determining that the size of the available storage space in the target storage device is greater than or equal to the first threshold storage space, maintaining a current value of the first data retention interval for the target storage device;
in response to determining that the size of the available storage space in the target storage device is less than the first threshold storage space, determining whether the size of the available storage space in the target storage device is greater than or equal to a second threshold storage space required to retain a second number of copies accommodated within a data retention interval tolerance defined in the data protection policy; and in response to determining that the size of the available storage space in the target storage device is greater than or equal to the second threshold storage space, determining a new value of the first data retention interval based on the size of the available storage space, and modifying the data protection policy based on the new value of the first data retention interval.

9. The data protection policy management system of claim 8, wherein the instructions when executed cause the processing resource to tune a recovery point objective (RPO) for the given copy tier in response to a modification of the first data retention interval, wherein the tuning of the RPO modifies a frequency of capturing data copies for the given copy tier.

10. The data protection policy management system of claim 1, wherein, to tune an RPO for a given copy tier of the copy tiers defined in the data protection policy, the instructions when executed cause the processing resource to:
determine whether a setting of the RPO is achievable for a given data retention interval associated with the given copy tier;
in response to determining that the setting of the RPO is achievable for the given data retention interval associated with the given copy tier, maintain a current value of the RPO;
in response to determining that the setting of the RPO is not achievable for the given data retention interval associated with the given copy tier, determine whether the RPO within an RPO tolerance defined in the data protection policy is achievable;
in response to determining that the RPO within the RPO tolerance is achievable, determine a new value of the RPO, and modify the data protection policy based on the new value of the RPO.

11. A method comprising:
detecting, by a processing resource comprising a hardware processor, a failure associated with an application that is protected with a data protection policy, wherein the data protection policy comprises settings corresponding to a plurality of parameters comprising copy tiers and recovery point objectives (RPOs) for the copy tiers;
determining, by the processing resource, a type of the failure associated with the application;
based on the type of the failure, selecting, by the processing resource, an RPO from among the RPOs in the data protection policy to be tuned for a given copy tier of the copy tiers; and
tuning, by the processing resource, settings corresponding to the RPO by:
determining whether a setting of the RPO is achievable for a given data retention interval associated with the given copy tier;
in response to determining that the setting of the RPO is achievable for the given data retention interval associated with the given copy tier, maintaining a current value of the RPO;
in response to determining that the setting of the RPO is not achievable for the given data retention interval associated with the given copy tier, determining whether the RPO within an RPO tolerance defined in the data protection policy is achievable; and
in response to determining that the RPO within the RPO tolerance is achievable, determining a new value of the RPO within the RPO tolerance, and modifying the data protection policy based on the new value of the RPO.

12. The method of claim 11, further comprising tuning settings of the copy tiers, wherein tuning the settings of the copy tiers comprises:
    selecting a copy tier from the copy tiers; and
    discovering, for the selected copy tier, one or more candidate target storage devices.

13. The method of claim 11, further comprising tuning settings of the copy tiers, wherein the tuning of the settings of the copy tiers comprises:
    for a given copy tier of the copy tiers:
        discovering candidate target storage devices;
        checking to identify a first target storage device having a predetermined storage space and a predetermined performance headroom from the candidate target storage devices;
        if the first target storage device having the predetermined storage space and the predetermined performance headroom is identified by the checking, configuring the first target storage device as a target storage device for the given copy tier; and
        if the first target storage device having the predetermined storage space and performance headroom is not identified by the checking,
            determining if a tiering tolerance defined in the data protection policy allows compromise in protection for the given copy tier,
            in response to determining that the tiering tolerance does not allow compromise in protection for the given copy tier, determining if an alternative copy tier corresponding to the given copy tier is defined in the data protection policy, and
            in response to determining that the alternative copy tier corresponding to the given copy tier is defined in the data protection policy, scanning a networked system to discover candidate target storage devices belonging to the alternative copy tier.

14. The method of claim 13, further comprising tuning a data retention interval for the given copy tier in response to determining that the tiering tolerance defined in the data protection policy allows compromise in protection for the given copy tier.

15. The method of claim 11, further comprising tuning settings of a data retention interval for the given copy tier, wherein the tuning of the settings of the data retention interval comprises:
    determining if a size of an available storage space in a target storage device corresponding to the given copy tier is greater than or equal to a first threshold storage space required to retain a first predetermined number of copies for the data retention interval;
    in response to determining that the size of the available storage space in the target storage device is greater than or equal to the first threshold storage space, maintaining a current value the data retention interval;
    in response to determining that the size of the available storage space in the target storage device is less than the first threshold storage space, determining whether the size of the available storage space in the target storage device is greater than or equal to a second threshold storage space required to retain a second number of copies accommodated within a data retention interval tolerance defined in the data protection policy; and
    in response to determining that the size of the available storage space in the target storage device is greater than or equal to the second threshold storage space, determining a new value of the data retention interval based on the size of the available storage space, and modifying the data protection policy based on the new value of the data retention interval.

16. The method of claim 15, further comprising tuning an RPO for the given copy tier in response to a modification of the data retention interval is modified.

17. The method of claim 11, comprising:
    in response to determining that the RPO within the RPO tolerance is not achievable, issuing a warning.

18. The data protection policy management system of claim 1, wherein the copy tiers comprise a first copy tier specifying use of snapshots of data, and a second copy tier specifying use of backups of data.

19. The data protection policy management system of claim 1, wherein the tuning of the at least one setting corresponding to the at least one selected parameter comprises tuning an RPO to modify a frequency of capturing data copies for a given copy tier.

\* \* \* \* \*